United States Patent
Ishida

(10) Patent No.: US 8,236,391 B2
(45) Date of Patent: Aug. 7, 2012

(54) COMPOSITION FOR FORMING ALIGNMENT FILM, AND METHOD FOR MANUFACTURING LIQUID CRYSTAL DEVICE

(75) Inventor: Kohei Ishida, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1022 days.

(21) Appl. No.: 12/194,865

(22) Filed: Aug. 20, 2008

(65) Prior Publication Data

US 2009/0068345 A1  Mar. 12, 2009

(30) Foreign Application Priority Data

Sep. 6, 2007 (JP) .................. 2007-231117

(51) Int. Cl.
 *C09K 19/56* (2006.01)
 *G02F 1/1337* (2006.01)
(52) U.S. Cl. ............. 428/1.2; 252/299.4; 349/124
(58) Field of Classification Search ............ 428/1.2; 252/299.4; 349/124
See application file for complete search history.

(56) References Cited

U.S. PATENT DOCUMENTS

| 2006/0164591 A1* | 7/2006 | Hiruma ............. 349/191 |
| 2007/0190267 A1 | 8/2007 | Hiruma et al. |
| 2009/0068343 A1 | 3/2009 | Ishida |

FOREIGN PATENT DOCUMENTS

| CN | 101021654 A | 8/2007 |
| JP | H09-005753 A | 1/1997 |
| JP | 2002-069381 A | 3/2002 |
| JP | 2003-295195 A | 10/2003 |
| JP | 2006-017982 A | 1/2006 |
| JP | 2006-030961 A | 2/2006 |
| JP | 2009-80454 A | 4/2009 |

* cited by examiner

*Primary Examiner* — Shean Wu
(74) *Attorney, Agent, or Firm* — Global IP Counselors, LLP

(57) ABSTRACT

A composition for forming an alignment film used during formation of an alignment film with a droplet discharge method includes a solute, a first organic solvent and a second organic solvent. The solute includes an alignment film formation material. The first organic solvent dissolves the solute. The second organic solvent is for controlling surface tension. The first organic solvent includes a solvent having a lowest vapor pressure among all of solvent components in the composition.

7 Claims, 9 Drawing Sheets

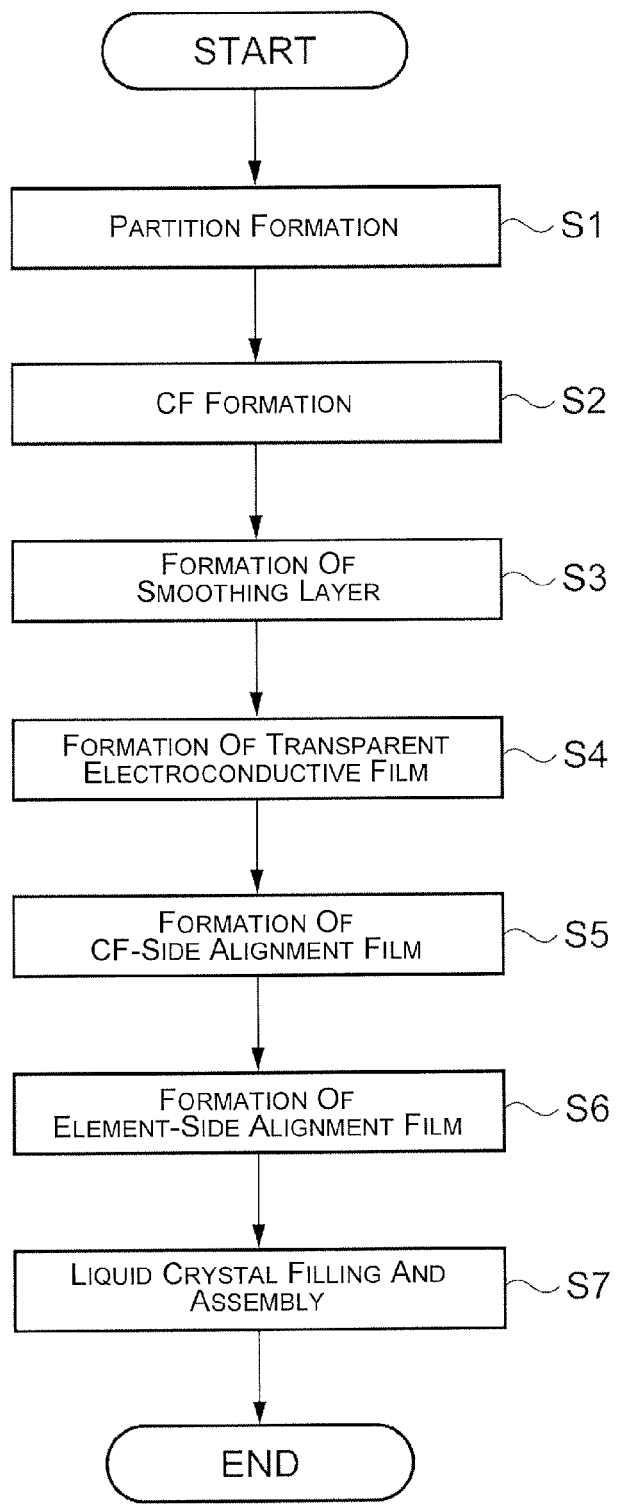
F I G. 2

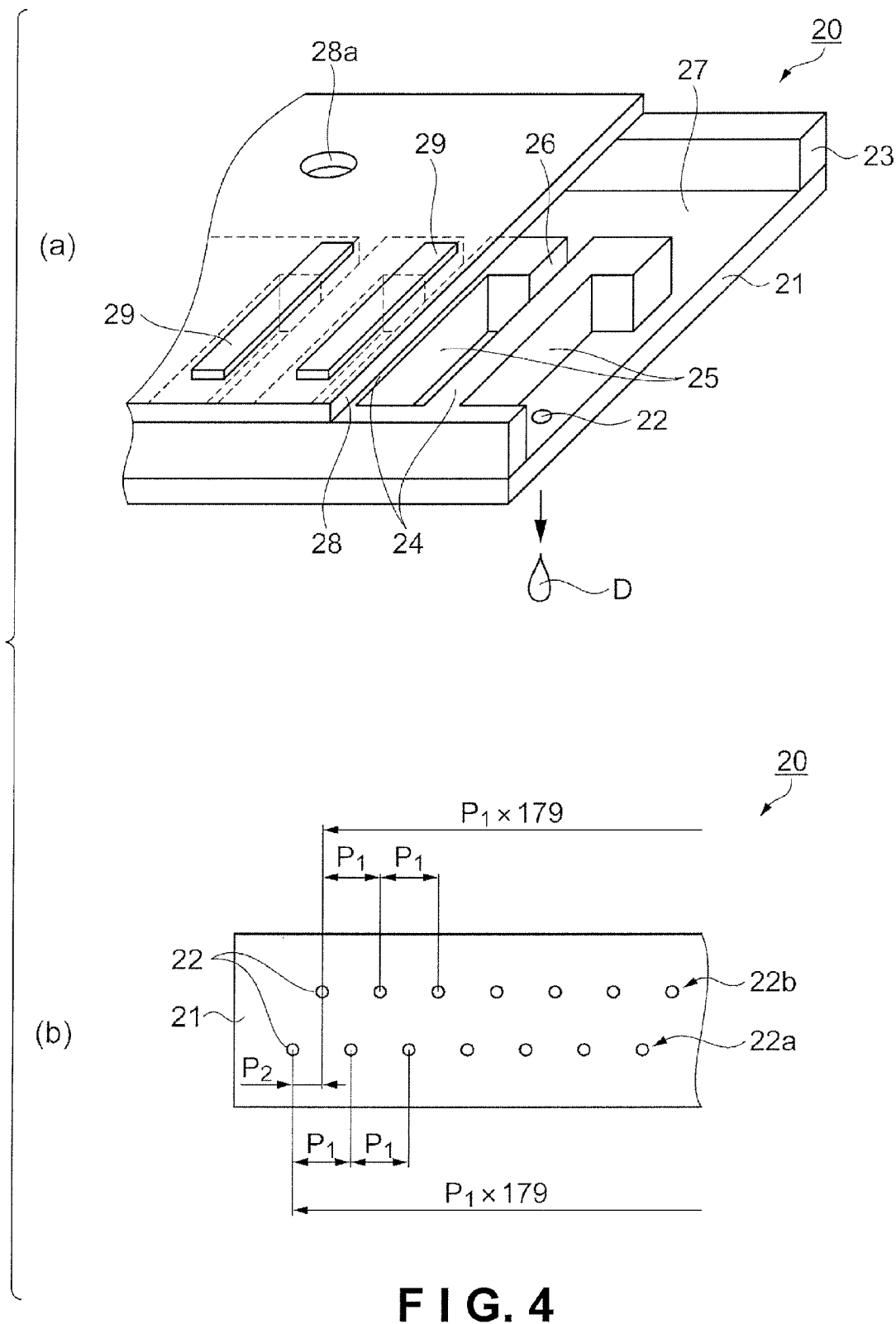
F I G. 4

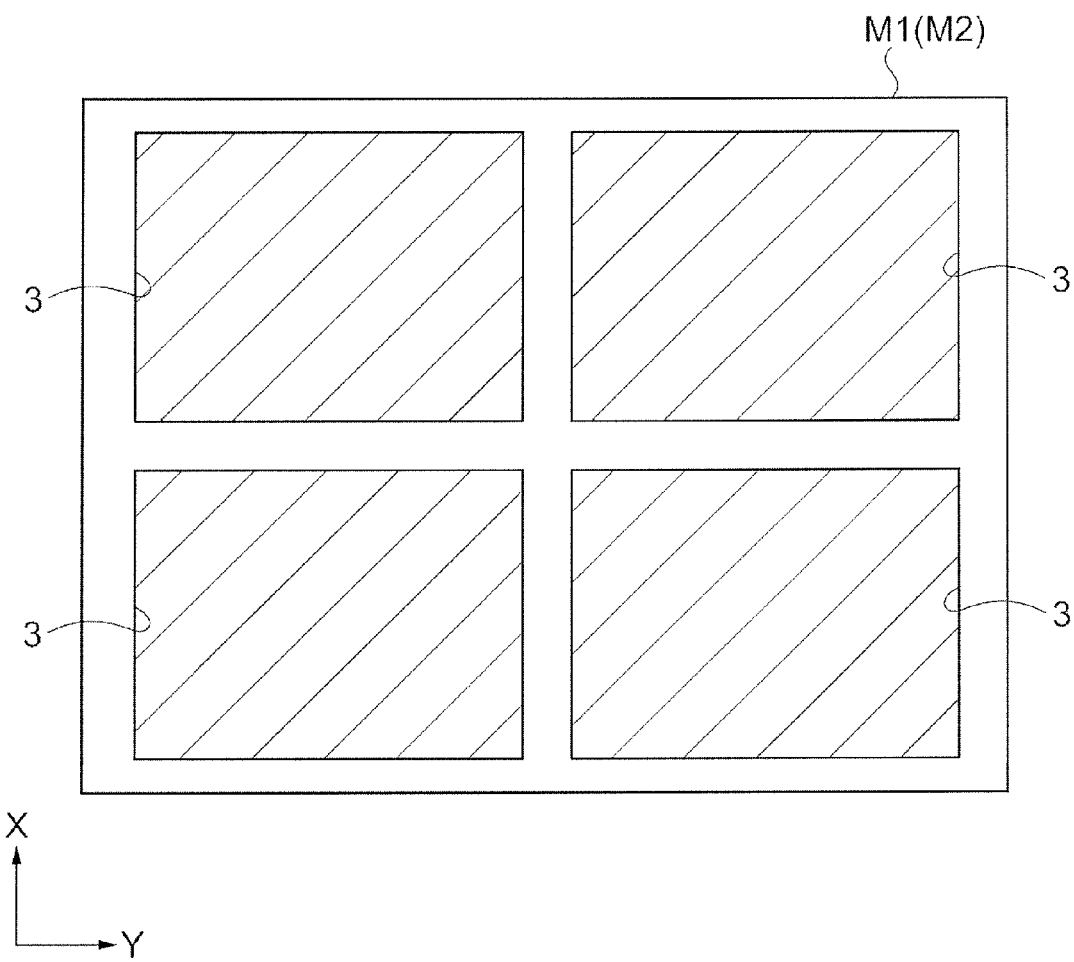
F I G. 5

(a)

| | | VAPOR PRESSURE | BOILING POINT | SURFACE TENSION | VIS-COSITY | | EXAMPLE 1 | EXAMPLE 2 | EXAMPLE 3 | EXAMPLE 4 | EXAMPLE 5 | EXAMPLE 6 |
|---|---|---|---|---|---|---|---|---|---|---|---|---|
| FIRST ORGANIC SOLVENT | γ-BUTYROLACTONE | 0.45 | 204 | 44 | 1.1 | wt% | 40 | 40 | 40 | | | |
| | N-METHYL-2-PYRROLIDONE | 0.29 | 204 | 41 | 1.0 | | 30 | 30 | 30 | | | |
| | N,N'-DIMETHYL-2-IMIDAZOLIDINONE | 0.15 | 225 | 38.6 | 1.1 | | | | | 30 | 30 | 30 |
| | PROPYLENE CARBONATE | 0.03 | 242 | 44 | 2.5 | | | | | 40 | 40 | 40 |
| | $p_{min}(A)$ | | | | | | 0.29 | 0.29 | 0.29 | 0.03 | 0.03 | 0.03 |
| SECOND ORGANIC SOLVENT | DIETHYLENE GLYCOL DIMETHYL ETHER | 3.4 | 162 | 28.1 | 1.1 | wt% | 30 | | | | | |
| | DIETHYLENE GLYCOL ETHYL METHYL ETHER | 0.675 | 176 | 26.8 | 1.2 | | | 30 | | | | |
| | ETHYLENE GLYCOL MONOBUTYL ETHER | 0.6 | 170 | 27.4 | 3.2 | | | | 30 | 30 | | |
| | DIETHYLENE GLYCOL MONOETHYL ETHER | 0.13 | 202 | 31.8 | 4.5 | | | | | | | |
| | DIETHYLENE GLYCOL BUTYL METHYL ETHER | 0.11 | 212 | 24.1 | 1.6 | | | | | | 30 | |
| | DIETHYLENE GLYCOL DIBUTYL ETHER | 0.01 | 256 | 24.9 | 2.4 | | | | | | | 30 |
| | $p_{min}(B)$ | | | | | | 3.4 | 0.675 | 0.6 | 0.6 | 0.13 | 0.11 |
| | $p_{min}(B) - p_{min}(A)$ | | | | | | POSITIVE | POSITIVE | POSITIVE | POSITIVE | POSITIVE | POSITIVE |
| | FILM FORMATION | | | | | | ○ | ○ | ○ | ○ | ○ | ○ |

(b)

| | | VAPOR PRESSURE | BOILING POINT | SURFACE TENSION | VIS-COSITY | | COMPARATIVE EXAMPLE 1 | COMPARATIVE EXAMPLE 2 | COMPARATIVE EXAMPLE 3 |
|---|---|---|---|---|---|---|---|---|---|
| FIRST ORGANIC SOLVENT | γ-BUTYROLACTONE | 0.45 | 204 | 44 | 1.1 | wt% | 40 | 40 | |
| | N-METHYL-2-PYRROLIDONE | 0.29 | 204 | 41 | 1.0 | | 30 | 30 | |
| | N,N'-DIMETHYL-2-IMIDAZOLIDINONE | 0.15 | 225 | 38.6 | 1.1 | | | | 30 |
| | PROPYLENE CARBONATE | 0.03 | 242 | 44 | 2.5 | | | | 40 |
| | $p_{min}(A)$ | | | | | | 0.29 | 0.29 | 0.03 |
| SECOND ORGANIC SOLVENT | DIETHYLENE GLYCOL DIMETHYL ETHER | 3.4 | 162 | 28.1 | 1.1 | wt% | | | |
| | DIETHYLENE GLYCOL ETHYL METHYL ETHER | 0.675 | 176 | 26.8 | 1.2 | | | | |
| | ETHYLENE GLYCOL MONOBUTYL ETHER | 0.6 | 170 | 27.4 | 3.2 | | | | |
| | DIETHYLENE GLYCOL MONOETHYL ETHER | 0.13 | 202 | 31.8 | 4.5 | | 30 | | |
| | DIETHYLENE GLYCOL BUTYL METHYL ETHER | 0.11 | 212 | 24.1 | 1.6 | | | 30 | |
| | DIETHYLENE GLYCOL DIBUTYL ETHER | 0.01 | 256 | 24.9 | 2.4 | | | | 30 |
| | $p_{min}(B)$ | | | | | | 0.13 | 0.01 | 0.01 |
| | $p_{min}(B) - p_{min}(A)$ | | | | | | NEGATIVE | NEGATIVE | NEGATIVE |
| | FILM FORMATION | | | | | | × | × | × |

F I G. 9

US 8,236,391 B2

COMPOSITION FOR FORMING ALIGNMENT FILM, AND METHOD FOR MANUFACTURING LIQUID CRYSTAL DEVICE

CROSS-REFERENCE TO RELATED APPLICATIONS

This application claims priority to Japanese Patent Application No. 2007-231117 filed on Sep. 6, 2007. The entire disclosure of Japanese Patent Application No. 2007-231117 is hereby incorporated herein by reference.

BACKGROUND

1. Technical Field

The present invention relates to a composition for forming an alignment film used during formation of an alignment film by a droplet discharge method, and to a method for manufacturing a liquid crystal device using the composition for forming an alignment film.

2. Related Art

A liquid crystal device for holding a liquid crystal between a pair of substrates is provided with an alignment film for orienting the liquid crystal molecules in a prescribed direction in the surface of the substrate. Flexography and spin coating are commonly used as methods for forming a conventional alignment film. In flexography, damaged flexographic plates for printing and foreign matter deposits are factors that cause printing defects, and it is therefore laborious to handle and maintain the plates. There is a problem in that a considerable amount of printing material is required in order to spread the printing material on a flexographic plate, and the method is wasteful. There is a problem in spin coating as well in that the material that actually contributes to film formation is about 10% of the applied material, most of the applied material initially ends up being discarded, and wasted material is therefore considerable.

Droplet discharge methods are being closely examined in order to reduce such wasted applied material, the methods being typified by the inkjet method that can distribute a required amount of ink in required locations.

In order to form an alignment film using the droplet discharge method, a composition for forming an alignment film is dissolved in a suitable solvent to form a solution, the solution is discharged onto a substrate using the droplet discharge method, and the deposited solution is heated and dried to remove the solvent component, whereby a film is formed and an alignment film is obtained. The resulting alignment film is rubbed or subjected to another orientation treatment in order to orient the liquid crystal molecules in a prescribed direction as required.

Japanese Laid-Open Patent Application No. 2003-295195 discloses compositions for forming an alignment film suitable for the droplet discharge method can be dissolved in a solvent which contains at least one compound selected from γ-butyrolactone and butyl cellosolve and in which the ratio of the total content of the solvent accounts for 90 wt % or more of the entire solvent.

Japanese Laid-Open Patent Application No. 2006-30961 discloses a vertical liquid crystal alignment agent having a first organic solvent that contains a nitrogen atom in the molecule, the tensile strength being 39 dyne/cm or higher; a second organic solvent that does not contain a nitrogen atom in the molecule, the tensile strength being 39 dyne/cm or higher; and a third organic solvent in which the surface tension is 32 dyne/cm, as well as polyimide and/or a partially-imidized polyamic acid polymer.

SUMMARY

However, there is a problem in that streaks form along the direction of scanning when a composition for forming an alignment film described in the patent documents is discharged as droplets from a nozzle onto a substrate using the inkjet method to form a film coating. Non-uniformities in the thickness of the film thought to be caused by the streaks also form in an alignment film obtained by baking the film coating.

The factors involved in the generation of streaks are thought to include the fact that: (1) droplets do not adequately spread on the substrate, (2) the leveling characteristics of the discharged droplets are poor and solute components precipitate in a nonuniform maimer, and (3) the coated solution degenerates during drying.

The present invention was contrived in order solve at least a portion of the problems described above, and can be implemented in the following modes or examples.

A composition for forming an alignment film according to a first aspect of the invention is used during formation of an alignment film with a droplet discharge method. The composition includes a solute, a first organic solvent, and a second organic solvent. The solute includes an alignment film formation material. The first organic solvent dissolves the solute. The second organic solvent is for controlling surface tension. The first organic solvent includes a solvent having a lowest vapor pressure among all of solvent components in the composition.

In accordance with this configuration, a solvent having a lowest possible vapor pressure contained in the first organic solvent among the solvent components is left until last and is dried when a film coating coated by the droplet discharge method is dried and a film is formed. Consequently, the first organic solvent evaporates earlier than the second organic solvent, and a reduction in the leveling characteristics due to precipitation of the solute can be prevented. In other words, the leveling characteristics are improved, coating non-uniformities are reduced, and an alignment film having a more uniform thickness can be obtained.

The composition as described above may be arranged so that the first organic solvent is from 50 to 95 wt % of all of the solvent components with the solvent having the lowest possible vapor pressure being 25 to 95 wt % of all of the solvent components.

In accordance with this configuration, since the ratio of the first organic solvent is at least 50%, the solute thoroughly dissolves, and since the ratio of the solvent having a lowest possible vapor pressure contained in the first organic solvent is at least 25 wt %, the leveling characteristics can be assured. Also, since the ratio of the second organic solvent is at least 5 wt %, the surface tension of a coating solution can be set in which a droplet discharge method can be applied. A composition for forming an alignment film that readily spreads on a substrate can thereby be provided.

The composition as described above may be arranged so that the first organic solvent includes N-methyl-2-pyrrolidone and γ-butyrolactone, and the second organic solvent includes at least one of diethylene glycol dimethyl ether, diethylene glycol ethyl methyl ether, and ethylene glycol monobutyl ether.

The composition as described above may be arranged so that the first organic solvent includes N,N'-dimethyl-2-imidazolidinone and propylene carbonate, and the second organic solvent includes at least one of diethylene glycol dimethyl ether, diethylene glycol ethyl methyl ether, ethylene glycol monobutyl ether, diethylene glycol monoethyl ether, and diethylene glycol butyl methyl ether.

In accordance with the example described above, a composition for forming an alignment film that improves leveling characteristics, reduces coating nonuniformity, and can form an alignment film having a more uniform thickness can be provided by using commercially available organic solvents.

The composition as described above may be arranged so that the solute has a solid concentration of 1 wt % or more and 10 wt % or less, a viscosity of 3 mPa·s or more and 20 mPa·s or less, and a surface tension of 30 mN/m or more and 45 mN/m or less.

When the solids concentration is less than 1 wt %, the resulting alignment film becomes excessively thin and is liable to no longer be a satisfactory alignment film. When the solids concentration exceeds 10 wt %, the resulting alignment film becomes excessively thick and is liable to no longer be a satisfactory alignment film, the viscosity of the composition for forming an alignment film increases, and the discharge characteristics in a droplet discharge method are reduced. In accordance with this configuration, a composition for forming an alignment film having a solids concentration suitable for a droplet discharge method can be obtained.

The fluidity is improved and stable discharge characteristics can be assured in a droplet discharge method by adjusting the viscosity to be 3 mP·s or more and 20 mPa·s or less. A composition for forming an alignment film in which the wettability on a substrate surface in improved and that is suitable for a droplet discharge method can be provided by adjusting the surface tension to be 30 mN/m or more and 45 mN/m or less. In this case, the second organic solvent for controlling surface tension is preferably an organic solvent in which the surface tension is less than 32 mN/m.

A method for manufacturing a liquid crystal device according to another aspect of the invention includes coating a surface of a substrate of the liquid crystal device by discharging droplets of the composition as described above, and forming an alignment film on the substrate by processing the composition discharged onto the substrate.

In accordance with this method, an alignment film having a more uniform thickness can be obtained because a composition for forming an alignment film that can improve leveling and reduce coating non-uniformities is used. In other words, non-uniformities caused by nonuniform coating are reduced, and a liquid crystal device having high display quality can be manufactured.

BRIEF DESCRIPTION OF THE DRAWINGS

Referring now to the attached drawings which form a part of this original disclosure:

FIG. 2 is a flowchart showing a method for manufacturing a liquid crystal device;

FIG. 4 includes a pair of diagrams (a) and (b) with the diagram (a) is a schematic perspective view showing the configuration of a droplet discharge head, and the diagram (b) is a schematic plan view showing the arrangement of a plurality of nozzles;

FIG. 5 is a schematic plan view showing a mother substrate;

FIG. 9 includes a pair of tables (a) and (b) showing the examples, comparative examples, and corresponding evaluation results of a composition for forming an alignment film applied to the manufacture of a liquid crystal device, where the table (a) shows the examples, and the table (b) shows the comparative examples.

DETAILED DESCRIPTION OF EXEMPLARY EMBODIMENTS

Composition for Forming Alignment Film

Figure 1:
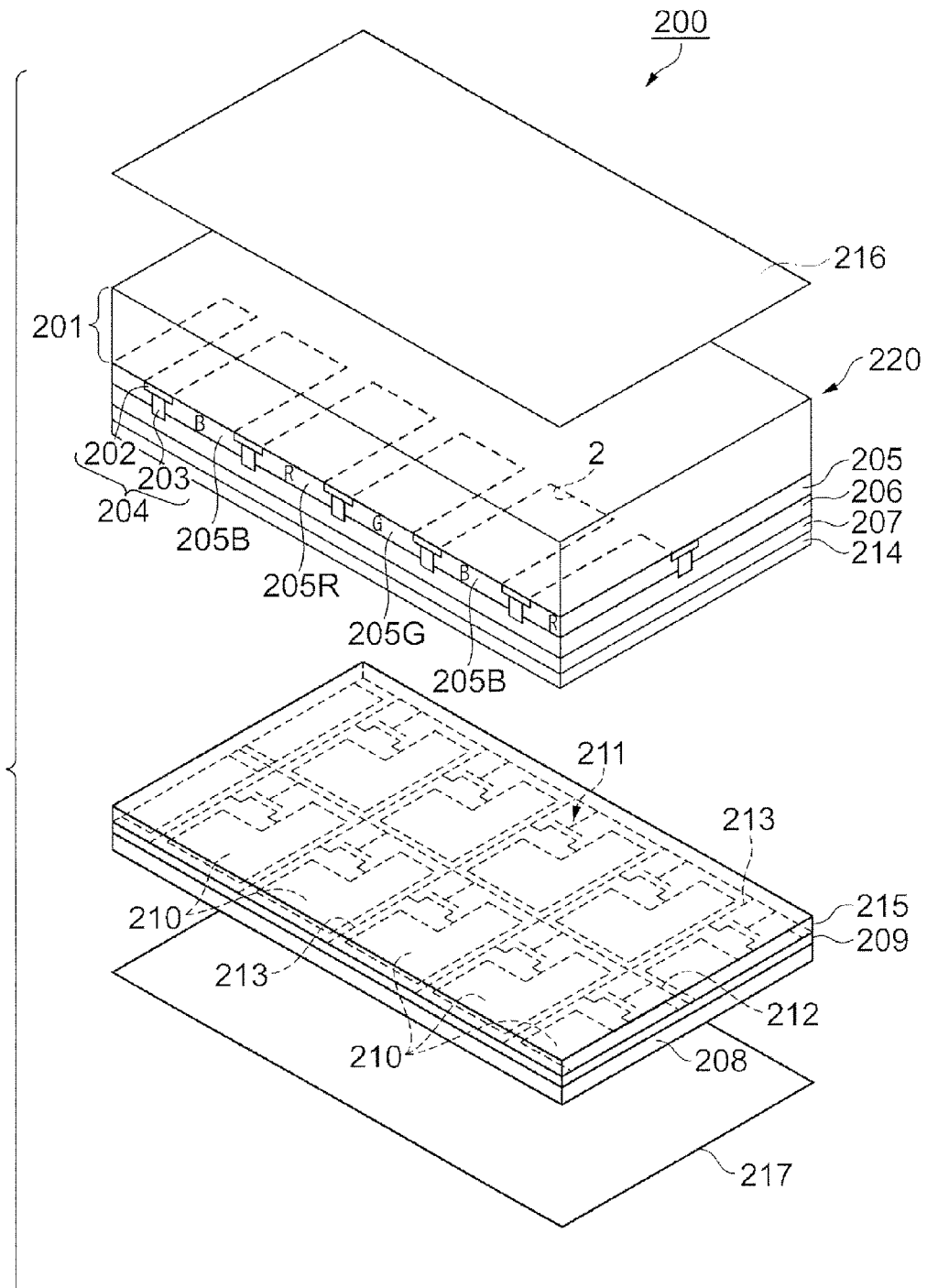
FIG. 1 is a schematic exploded perspective view showing the structure of a liquid crystal device.

First, the composition for forming an alignment film according to the present embodiment will be described. The composition for forming an alignment film according to the present embodiment is an ink used when an alignment film is formed by an inkjet method as a method for discharging droplets using a later-described droplet discharge device, and contains a solute, which is the alignment film material, a first organic solvent primarily for dissolving the solute, and a second organic solvent for controlling the surface tension.

The first organic solvent and the second organic solvent are composed of one or a plurality of organic solvents, and a solvent having a lowest possible vapor pressure is contained in the first organic solvent. A mixture of the first organic solvent and the second organic solvent will be referred to hereinafter as a "mixed solvent."

The first organic solvent that is used is selected from a polar aprotic solvent or phenol-based solvent. Examples of the polar aprotic solvent include amide-based solvents, sulfoxide-based solvents, ether-based solvents, and nitrile-based solvents. Among these, amide-based solvents and sulfoxide-based solvents are preferably used from the viewpoint of solute solubility and drying characteristics.

Examples of the amide-based solvent include N-methyl-2-pyrrolidone, N-ethyl-2-pyrrolidone, N,N'-dimethyl-2-imidazolidinone, N,N-dimethylacetamide, N,N-dimethyl formamide, hexamethylphosphoramide, tetramethylurea and the like.

Examples of a sulfoxide-based solvent include dimethyl sulfoxide, diethyl sulfoxide and the like.

Examples of a phenol-based solvent include o-cresol, m-cresol, p-cresol, and other cresols; o-xylenol, m-xylenol, p-xylenol, and other xylenols; phenols; and o-chlorophenol, m-chlorophenol, o-bromophenol, m-bromophenol, and other halogenated phenols.

Among these, at least one solvent is advantageously used, being selected from a group composed of N-methyl-2-pyrrolidone, N,N'-dimethyl-2-imidazolidinone, γ-butyrolactone, and propylene carbonate.

The vapor pressure at 25° C., the boiling point, the surface tension at 25° C., and the viscosity of these solvents are as follows (see FIG. 9).

N-methyl-2-pyrrolidone has a vapor pressure of 0.29 mmHg, a boiling point of 204° C., a surface tension of 41 mN/m, and a viscosity of 1.0 mPa·s.

N,N'-dimethyl-2-imidazolidinone has a vapor pressure of 0.15 mmHg, a boiling point of 225° C., a surface tension of 38.6 mN/m, and a viscosity of 1.1 mPa·s.

γ-Butyrolactone has a vapor pressure of 0.45 mmHg, a boiling point of 204° C., a surface tension of 44 mN/m, and a viscosity of 1.1 mPa·s.

Propylene carbonate has a vapor pressure of 0.03 mmHg, a boiling point of 242° C., a surface tension of 44 mN/m, and a viscosity of 2.5 mPa·s.

These solvents are good solvents having good solubility in relation to the later-described alignment film formation material, and good solubility of the mixed solvent in relation to the alignment film formation material can be assured by using at least one type of these solvents.

Such a first organic solvent has a comparatively high surface tension and does not readily wet and spread over the substrate surface acting as the formation surface of the alignment film. Therefore, a composition in which only the first organic solvent is mixed is liable to be unable to sufficiently form a film on the surface of a substrate.

In view of the above, the mixed solvent is one in which the surface tension is relatively low at less than 32 mN/m and that contains a second organic solvent having good wettability.

Specific examples include methyl alcohol, ethyl alcohol, isopropyl alcohol, cyclohexanol, 4-hydroxy-4-methyl-2-pentanone(diacetone alcohol), 1-methoxy-2-propanol, 1-methoxy-2-acetoxypropane, ethylene glycol, propylene glycol, 1,4-butanediol, triethylene glycol, and other alcohol-based solvents; acetone, methyl ethyl ketone, methyl isobutyl ketone, cyclohexanone, and other ketone-based solvents; ethylene glycol monomethyl ether, diethyl ether, ethylene glycol methyl ether, ethylene glycol ethyl ether, ethylene glycol-n-propyl ether, ethylene glycol isopropyl ether, ethylene glycol monobutyl ether(butyl cellosolve), ethylene glycol dimethyl ether, ethylene glycol ethyl ether acetate, diethylene glycol monomethyl ether, diethylene glycol monoethyl ether, diethylene glycol dimethyl ether, diethylene glycol diethyl ether, diethylene glycol ethyl methyl ether, diethylene glycol butyl methyl ether, diethylene glycol dibutyl ether, dipropylene glycol monomethyl ether, diethylene glycol monomethyl ether acetate, diethylene glycol monoethyl ether acetate, tetrahydrofuran, and other ether-based solvents; ethyl lactate, butyl lactate, methyl acetate, ethyl acetate, butyl acetate, methyl methoxy propionate, ethyl ethoxy propionate, diethyl oxalate, diethyl malonate, and other ester-based solvents; and dichloromethane, 1,2-dichloroethane, 1,4-dichlorobutane, trichloroethane, chlorobenzene, o-dichlorobenzene, and other halogenated hydrocarbon-based solvents; n-hexane, n-heptane, n-octane, and other aliphatic hydrocarbon-based solvents; and benzene, toluene, xylene, and other aromatic hydrocarbon-based solvents. These solvents may be used alone or in a combination of two or more solvents.

Advantageously used among these is at least one ether-based solvent selected from ethylene glycol monobutyl ether, diethylene glycol dimethyl ether, diethylene glycol monoethyl ether, diethylene glycol ethyl methyl ether, and diethylene glycol butyl methyl ether.

The vapor pressure, surface tension, and viscosity at 25° C. of these solvents are as follows (see FIG. 9).

Ethylene glycol monobutyl ether (butyl cellosolve) has a vapor pressure of 0.6 mmHg, a surface tension of 27.4 mN/m, and a viscosity of 3.2 mPa·s.

Diethylene glycol dimethyl ether has a vapor pressure of 3.4 mmHg, a surface tension of 28.1 mN/m, and a viscosity of 1.1 mPa·s.

Diethylene glycol monoethyl ether has a vapor pressure of 0.13 mmHg, a surface tension of 31.8 mN/m, and a viscosity of 4.5 mPa·s.

Diethylene glycol ethyl methyl ether has a vapor pressure of 0.675 mmHg, a surface tension of 26.8 mN/m, and a viscosity of 1.2 mPa·s.

Diethylene glycol butyl methyl ether has a vapor pressure of 0.11 mmHg, a surface tension of 24.1 mN/m, and a viscosity of 1.6 mPa·s.

These solvents do not exhibit good solubility in relation to the alignment film formation material described below. Therefore, although these solvents are poor solvents, they have a relatively low surface tension and good wettability on the surface of a substrate. Accordingly, streaks caused by insufficient wettability of the composition for forming an alignment film are reduced, upward bleeding (bumps) at the edge portion of a formed alignment film is reduced, and an alignment film can be formed at a uniform desired thickness.

The preferred mixing ratio of such a second organic solvent preferably accounts for 5 wt % or more and 50 wt % or less of the entire mixed solvent. Good wettability in relation to the substrate (formation surface of the alignment film) of the composition for forming an alignment film can be assured by adding 5 wt % of a second organic solvent having good wettability.

Streaks are thereby reduced and a flat, uniform alignment film can be formed. The ratio is kept to 50 wt % or less, whereby the second organic solvent, which is a weak solvent, does not account for a majority of mixed solvent, the good solubility of the mixed solvent in relation to the alignment film formation material (solute) is assured, and good film formation characteristics can be obtained. It is apparent that consideration must be given to the solids concentration in relation to the ratio between the first organic solvent and the second organic solvent. The ratio of the first organic solvent is preferably increased when the solids concentration of the solute is increased.

The mixed solvent containing these first and second organic solvents contains a solvent having a lowest possible vapor pressure in the first organic solvent. In other words, the first organic solvent and the second organic solvent are combined so that a solvent having a lowest possible vapor pressure and solubility in relation to the alignment film formation material is contained in the first organic solvent.

Therefore, the composition for forming an alignment film according to the present embodiment prevents a situation in which the good solvent (first organic solvent) evaporates first during drying, and the remaining solvent during drying is only the poor solvent (second organic solvent). The solute in the good solvent that remains until the end in the drying process thereby flows and gradually precipitates due to drying. In other words, leveling characteristics are improved and an alignment film can be obtained in which the thickness of the film after drying is substantially uniform.

Alignment Film Formation Material

The alignment film formation material to be dissolved in a mixed solvent and to form solid content will be described next.

The alignment film formation material contained in the composition for forming an alignment film according to the present embodiment is not particularly limited, and a conventional alignment film formation material may be used. Examples include polyamic acid, polyimide, polyamic acid ester, polyester, polyamide, polysiloxane, cellulose derivative, polyacetal, polystyrene derivative, polystyrene-phenyl maleimide derivative, and poly(meth)acrylate.

Among these, a polymer is preferred that has at least one unit selected from the repeating unit shown in the following chemical formula (1) and the repeating unit shown in the chemical formula (2) because an alignment film having excellent liquid crystal orientation ability can be formed as well as for other reasons.

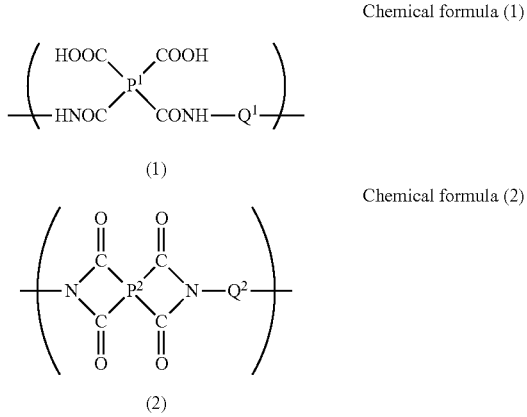

Chemical formula (1)

(1)

Chemical formula (2)

(2)

Examples of such a polymer include (i) polyamic acid having the repeating unit shown in chemical formula (1), (ii) an imidized polymer having the repeating unit shown in chemical formula (2), (iii) a block copolymer composed of an amic acid prepolymer having the repeating unit shown in chemical formula (1), and an imide prepolymer having the repeating unit shown in the chemical formula (2). These may be used singly or in a combination of two or more. When used in a combination of two or more, polyamic acid and an imidized polymer are preferably used in a mixture.

(i) Polyamic Acid

Polyamic acid can be obtained by reacting tetracarboxylic dianhydride and diamine.

Examples of the tetracarboxylic dianhydride used for synthesizing polyamic acid include 1,2,3,4-cyclobutane tetracarboxylic dianhydride, 1,2-dimethyl-1,2,3,4-cyclobutane tetracarboxylic dianhydride, 1,3-dimethyl-1,2,3,4-cyclobutane tetracarboxylic dianhydride, 1,3-dichloro-1,2,3,4-cyclobutane tetracarboxylic dianhydride, 1,2,3,4-tetramethyl-1,2,3, 4-cyclobutane tetracarboxylic dianhydride, 1,2,3,4-cyclopentane tetracarboxylic dianhydride, 1,2,4,5-cyclohexane tetracarboxylic dianhydride, 3,3',4,4'-dicyclohexyl tetracarboxylic dianhydride, cis-3,7-dibutyl cyclo-octa-1,5-diene-1, 2,5,6-tetracarboxylic dianhydride, 2,3,5-tricarboxycyclopentyl acetic dianhydride, 3,5,6-tricarbonyl-2-carboxy norbornane-2:3,5:6-dianhydride, and 2,3,4,5-tetrahydrofuran tetracarboxylic dianhydride. It is also possible to use aliphatic tetracarboxylic dianhydride and aromatic tetracarboxylic dianhydride. These may be used singly or in a combination of two or more.

Examples of the diamine that is used for synthesizing polyamic acid include p-phenylene diamine, m-phenylene diamine, 4,4'-diaminodiphenyl methane, 4,4'-diaminodiphenyl ethane, 4,4'-diaminodiphenyl sulfide, 4,4'-diaminodiphenyl sulfone, 2,2'-dimethyl-4,4'-diaminobiphenyl, 3,3'-dimethyl-4,4'-diaminobiphenyl, 4,4'-diaminobenzanilide, 4,4'-diaminodiphenyl ether, 1,5-diaminonaphthalene, 3,3-dimethyl-4,4'-diaminobiphenyl, 5-amino-1-(4'-aminophenyl)-1,3,3-trimethyl indane, 6-amino-1-(4'-aminophenyl)-1,3,3-trimethyl indane, 3,4'-diaminodiphenyl ether, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl] hexafluoropropane, 2,2-bis(4-aminophenyl) hexafluoropropane, 2,2-bis[4-(4-aminophenoxy)phenyl] sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 2,7-diaminofluorene, 9,9-bis(4-aminophenyl)fluorene, 4,4'-methylene-bis (2-chloroaniline), 2,2',5,5'-tetrachloro-4,4'-diaminobiphenyl, 2,2'-dichloro-4,4'-diamino-5,5'-dimethoxy biphenyl, 3,3'-dimethoxy-4,4'-diaminobiphenyl, 1,4,4'-(p-phenylene isopropylidene)bisaniline, 4,4'-(m-phenylene isopropylidene)bisaniline, 2,2'-bis[4-(4-amino-2-trifluoromethyl phenoxy)phenyl]hexafluoropropane, 4,4'-diamino-2,2'-bis(trifluoromethyl)biphenyl, 4,4'-bis[(4-amino-2-trifluoromethyl) phenoxy]-octafluorobiphenyl, and other aromatic diamines. It is also possible to use aliphatic and alicyclic diamines, and a diamine having two primary amino groups in the molecule and a nitrogen atom other than the primary amino groups. These diamines may be used singly or in a combination of two or more.

When it is desired that pretilt angle generation be imparted to the composition for forming an alignment film, it is preferred that all or a part of $Q_1$ in chemical formula (1) and/or $Q_2$ in chemical formula (2) be at least one group expressed in chemical formulas (3) and (4) below.

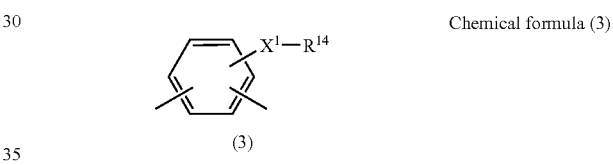

Chemical formula (3)

(3)

(wherein, $X^1$ is a single bond, —O—, —CO—, —COO—, —OCO—, —NHCO—, —CONH—, —S—, or an arylene group; $R^{14}$ is a $C_{10}$ to $C_{20}$ alkyl group, a $C_4$ to $C_{40}$ monovalent organic group having an aliphatic backbone, or a $C_6$ to $C_{20}$ monovalent organic group having a fluorine atom.)

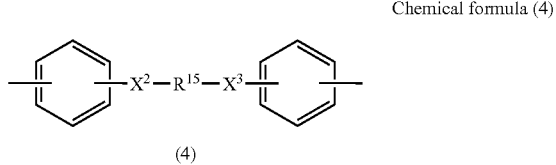

Chemical formula (4)

(4)

(wherein, $X^2$ and $X^3$ are independent single bonds, —O—, —CO—, —COO—, —OCO—, —NHCO—, —CONH—, —S—, or an arylene group; and $R^{15}$ is a $C_4$ to $C_{40}$ bivalent organic group having an aliphatic backbone.)

The usage ratio of a specific diamine in relation to the entire diamine content is different depending on the size of the desired pretilt angle, but it is preferred that the ratio be 0 to 5 mol % in the case of TN and STN liquid crystal display elements, and 5 to 100 mol % in the case of a vertical orientation liquid crystal display element.

Polyamic acid can be manufactured by reacting the above-described tetracarboxylic dianhydride and diamine in a suitable organic solvent ordinarily at −20 to +150° C., and more preferably at 0 to 100° C.

The usage ratio of tetracarboxylic dianhydride and diamine is preferably one in which an anhydride group of tetracarboxylic dianhydride is a ratio of 0.2 to 2 equivalent, and more preferably a ratio of 0.3 to 1.2 equivalent, per equivalent of amino groups in a diamine.

The organic solvent used in the synthesis reaction of polyamic acid is not limited as long as the organic solvent can dissolve polyamic acid. Examples include N-methyl-2-pyrrolidone, N,N-dimethylacetamide, N,N-dimethyl formamide, dimethyl sulfoxide, γ-butyrolactone, tetramethylurea, hexamethylphosphotriamide, and other polar aprotic solvents; and m-cresol, xylenol, phenol, halogenated phenol, and other phenol-based solvents.

The usage amount (α) of organic solvent is preferably such that the total amount (β) of tetracarboxylic dianhydride and diamine compound is 0.1 to 30 wt % with respect to the entire amount of reaction fluid (α+β).

A poor solvent of polyamic acid can be used in combination with the organic solvent in a range in which the generated polyamic acid does not precipitate.

Examples of a poor solvent of polyamic acid are the same as those listed as poor solvents of the alignment film formation material described above. These solvents may be used singly or in a combination of two or more.

The polyamic acid can be isolated by pouring the reaction fluid containing the polyamic acid into a large quantity of poor solvent to obtain a precipitate, and drying the precipitate under reduced pressure.

The polyamic acid can be purified by again dissolving the resulting polyamic acid in an organic solvent and subsequently performing the precipitation step in a poor solvent a single time or several times.

(ii) Imidized Polymer

An imidized polymer can be obtained by subjecting the polyamic acid described above to dehydration ring closure in accordance with a known method, e.g., the method described in Japanese Laid-open Patent Application No. 2003-295195. However, 100% of the repeating units of the imidized polymer is not required to undergo dehydration ring closure, and the ratio (hereinafter referred to as "imidization ratio") of the repeating units having an imide ring in all the repeating units may be less than 100%.

The imidization ratio of the imidized polymer is not particularly limited, but is preferably 40 mol % or higher, and is more preferably 70 mol % or higher. A composition for forming an alignment film can be obtained in which an alignment film having a short afterimage erasure time can be formed by using a polymer having an imidization ratio of 40 mol % or higher.

The polymer used in the present embodiment may be a terminal-modified polymer in which the molar weight has been adjusted. The coating suitability and the like of the composition for forming an alignment film can be improved by using this terminal-modified polymer.

Such a terminal-modified polymer can be synthesized by adding to the reaction system an acid monoanhydride, a monoamine compound, a monoisocyanate compound, or the like when a polyamic acid is synthesized. Examples of the acid monoanhydride include maleic anhydride, phthalic anhydride, itaconic anhydride, n-decylsuccinic anhydride, n-dodecylsuccinic anhydride, n-tetradecylsuccinic anhydride, and n-hexadecylsuccinic anhydride. Examples of the monoamine compound include aniline, cyclohexylamine, n-butylamine, n-pentylamine, n-hexylamine, n-heptylamine, n-octylamine, n-nonylamine, and n-decylamine, n-undecylamine, n-dodecylamine, n-tridecylamine, n-tetradecylamine, n-pentadecylamine, n-hexadecylamine, n-heptadecylamine, n-octadecylamine, and n-eicosylamine. Also, examples of the monoisocyanate compound include phenyl isocyanate and naphthyl isocyanate.

(iii) Block Copolymer

The block copolymer can be obtained by synthesizing an amic acid prepolymer having a terminal amino group or anhydride group, and an imide prepolymer having a terminal anhydride group or amino group, and by bonding the terminal anhydride group and amino group of the prepolymers.

The amic acid prepolymer can be synthesized by the same method as the method for synthesizing the polyamic acid described above. The imide prepolymer can be synthesized in the same manner as in the method for synthesizing the imidized polymer described above. A functional group having a terminal can be selected by adjusting the amount of tetracarboxylic dianhydride and diamine during the synthesis of the polyamic acid.

The composition for forming an alignment film of the present embodiment may contain a functional silane-containing compound or an epoxy group-containing compound in addition to the mixed solvent and the alignment film formation material with the aim of improving adhesiveness to the surface of the substrate.

The functional silane-containing compound and the epoxy group-containing compound to be used are not particularly limited, but conventionally known compounds may be used. The blending ratio of the functional silane-containing compound and the epoxy group-containing compound is ordinarily 40 parts by weight or less, and preferably 30 parts by weight or less, with respect to 100 parts by weight of the alignment film formation material.

The composition for forming an alignment film of the present embodiment may be manufactured by dissolving or dispersing, but preferably by dissolving, the alignment film formation material and the functional silane-containing compound as desired in the mixed solvent.

The concentration of the solids composed of the alignment film formation material is selected with consideration given to viscosity, surface tension, and other factors, but is preferably in a range of 1 wt % or more and 10 wt % or less. When the solids concentration is less than 1 wt %, the resulting alignment film is excessively thin, and there is a possibility that a good alignment film will not be obtained. When the solids concentration exceeds 10 wt %, the resulting alignment film is excessively thick, and there is a possibility that a good alignment film will not be obtained because the viscosity of the composition for forming an alignment film will increase and the discharge characteristics in a droplet discharge method will be reduced.

The viscosity of the composition for forming an alignment film, although not particularly limited, is preferably adjusted to be in a range of 3 mPa·s or more and 20 mPs·s or less (25° C.). Fluidity is improved and good, stable discharge characteristics can accordingly be assured in a droplet discharge method by adjusting the viscosity to be in this range.

The surface tension, although not particularly limited, is preferably adjusted to be in a range of 30 mN/m or higher and 45 mN/m or lower (25° C.). Wettability on the surface of a substrate is improved and, accordingly, an alignment film having uniform thickness can be formed with good efficiency in a droplet discharge method by adjusting the surface tension to be in this range.

In accordance with the composition described above, the following effects can be obtained.

(1) In accordance with the composition for forming an alignment film described above, a solvent having a lowest possible vapor pressure is contained in the first organic solvent. Therefore, leveling characteristics are improved, streaks are reduced, and a uniform, flat alignment film can be obtained when the composition is applied onto a substrate using a droplet discharge method. Since the surface tension of the mixed solvent is adjusted, upward bleeding (bumps) at the edge portion of the alignment film is reduced, and a high quality alignment film can be formed with good efficiency. Therefore, leveling characteristics are improved, and an alignment film having few coating non-uniformities can be formed even when a vertical alignment agent (composition for forming an alignment film on a liquid crystal having negative dielectric anisotropy) having particularly poor wettability on a substrate is used.

(2) A liquid crystal device having an alignment film with few coating non-uniformities can be manufactured by using the composition for forming an alignment film according to the present embodiment.

Method for Manufacturing Liquid Crystal Device

Next, the method for manufacturing a liquid crystal device in which the composition for forming an alignment film described above is used will be described with reference to the diagrams. The diagrams used in the description have been appropriately reduced or enlarged.

Liquid Crystal Device

First, the liquid crystal device will be described. FIG. 1 is a schematic exploded perspective view showing the structure of the liquid crystal device.

A liquid crystal device 200 is provided with a TFT (Thin Film Transistor) transmissive liquid crystal panel 220 and an illumination device 218 for illuminating the liquid crystal panel 220, as shown in FIG. 1. The liquid crystal panel 220 is provided with a counter substrate 201 having a color filter 205, an element substrate 208 having a TFT element 211 to which one of three terminals is connected to a pixel electrode 210, and a liquid crystal (not shown) held between a pair of substrates 201, 208. An upper polarizing plate 216 and a lower polarizing plate 217 for polarizing transmitted light are arranged on the surfaces of the pair of substrates 201, 208, which are the outside surface sides of the liquid crystal panel 220.

The counter substrate 201 is composed of transparent glass or another material, and three colors red (R), green (G), and blue (B), i.e., color filters 205R, 205G, 205B, are formed in a plurality of film formation areas 2 divided into the form of a matrix by partition walls 204 on the surface that faces the liquid crystal. Each of the partition walls 204 is composed of a lower layer bank 202 referred to as a black matrix composed of Cr or another metal having light-blocking properties or an oxide film thereof, and an upper layer bank 203 composed of an organic compound formed on top (facing downward in the diagram) of the lower layer bank 202. Also provided are an overcoat layer (OC layer) 206 as a smoothed layer for covering the partition walls 204 and the color filters 205R, 205G, 205B; and a counter electrode 207 composed of ITO (Indium Tin Oxide) or another transparent electroconductive film formed so as to cover the OC layer 206. An alignment film 214 is formed so as to cover the counter electrode 207.

The element substrate 208 is composed of the same transparent glass or another material, and has pixel electrodes 210 formed in the form of a matrix via an insulating film 209 on the surface that faces the liquid crystal, and a plurality of TFT elements 211 formed in correspondence with the pixel electrodes 210. The two other terminals that are not connected to the pixel electrodes 210 among the three terminals of the TFT element 211 are connected to a scan line 212 and a data line 213 that are arranged in the form a grid so as to surround the pixel electrode 210 in a mutually insulated state. Also, an alignment film 215 is formed so as to cover the pixel electrode 210, the TFT element 211, the scan line 212, and the data line 213.

The alignment films 214, 215 are composed of an alignment film formation material that has been selected for its ability to cause the liquid crystal molecules to form a horizontal orientation or a vertical orientation in accordance with the display mode of the liquid crystal panel 220, and are formed with a later-described droplet discharge method (inkjet method) using the composition for forming an alignment film described above, which contains the alignment film formation material.

The illumination device 218 may be any device as long as it has a light-guide plate, a diffusion plate, a reflection plate, or another configuration that can direct light from, e.g., a white LED, EL, cold cathode tube, or the like as a light source toward a liquid crystal panel 220.

The liquid crystal device 200 of the present embodiment provides high display quality with few display defects caused by coating non-uniformities because the alignment films 214, 215 are formed using the composition for forming an alignment film described above.

The liquid crystal device 200 is not limited to a TFT element 211 as an active element and may be one having a TFD (Thin Film Diode) element, or may be a passive liquid crystal device disposed so that electrodes constituting the pixels intersect each other. The upper and lower polarizing plates 216, 217 may be combined with a phase difference film or another optical functional film used with the aim of improving the visual angle dependency or for another purpose. The liquid crystal device is not limited to being a transmissive device, a reflective device, or a semi-transmissive reflective device.

Method for Manufacturing Liquid Crystal Device

Next, the method for manufacturing a liquid crystal device 200 will be described with reference to FIGS. 2 to 8. FIG. 2 is a flowchart showing the method for manufacturing a liquid crystal device.

The method for manufacturing the liquid crystal device 200 of the present embodiment has a partition wall formation step (step S1) for forming partition walls 204 on the surface of the counter substrate 201, a color filter (CF) formation step (step S2) for forming three color filters 205R, 205G, 205B in a film formation area 2 partitioned by the partition walls 204, a smoothing layer formation step (step S3) for forming a smoothing layer 206 so as to cover the partition walls 204 and the color filters 205, and a transparent electroconductive film formation step (step S4) for forming a counter electrode 207 so as to cover the smoothing layer 206, as shown in FIG. 2. The method also has a CF-side alignment film formation step (step S5) for forming an alignment film 214 so as to cover the counter electrode 207, and an element-side alignment film formation step (step S6) for forming an alignment film 215 so as to cover the pixel electrode 210, the TFT element 211, and the like. The method is furthermore provided with a liquid crystal filling and assembly step (step S7) for setting the counter substrate 201 and the element substrate 208 in opposition, filling a liquid crystal into the gap, and joining the two substrates 201, 208 in a prescribed position.

Figure 3:
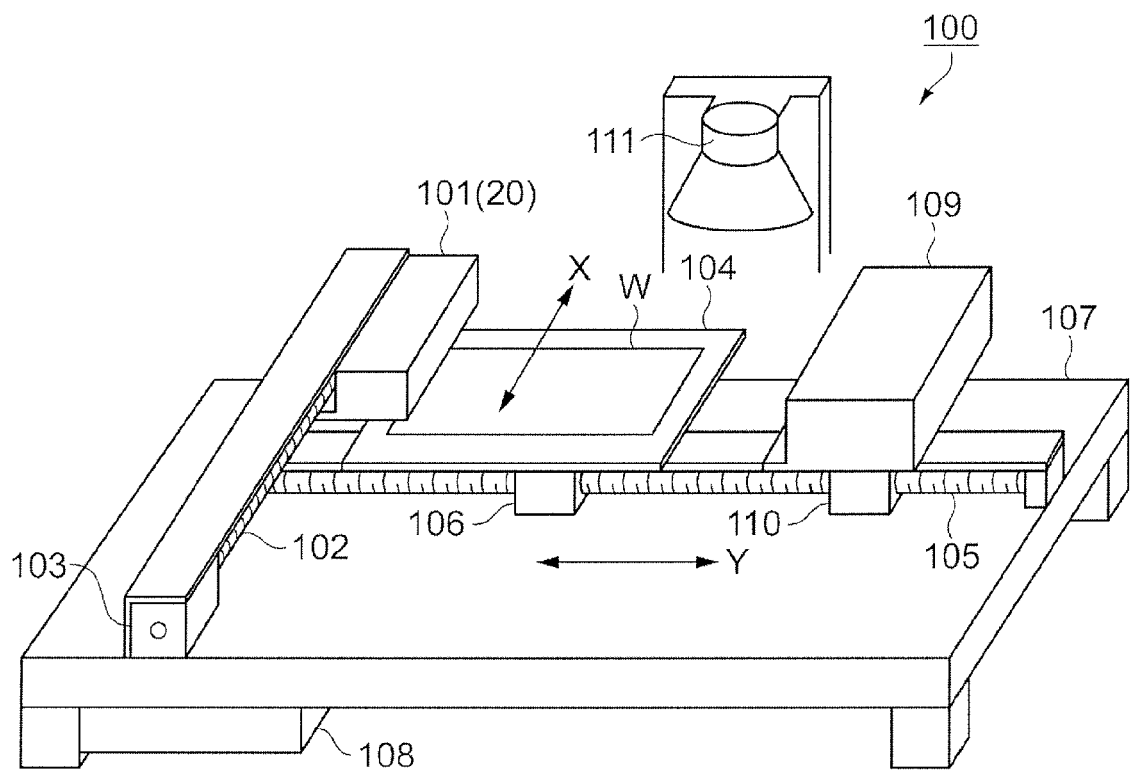
FIG. 3 is a schematic perspective view showing the structure of a droplet discharge device.

In the method for manufacturing a liquid crystal device 200 of the present embodiment, the CF formation step (step S2), the CF-side alignment film formation step (step S5), and the element-side alignment film formation step (step S6) are used to form a desired thin film using a droplet discharge method (inkjet method). In view of the above, a typical droplet discharge method for realizing a droplet discharge method (inkjet method) will be described in advance with reference to FIG. 3 and FIG. 4. FIG. 3 is a schematic perspective view showing the configuration of a droplet discharge device.

The droplet discharge device 100 discharges a fluid as droplets onto a workpiece W acting as a discharge target, and forms a coating film composed of the fluid, as shown in FIG. 3. The device is also provided with a stage 104 on which the workpiece W is mounted, and a head unit 101 on which a plurality of droplet-discharge heads 20 (see FIG. 4) are mounted for discharging as droplets a fluid onto a mounted workpiece W.

The device is also provided with an X-direction guide shaft 102 for driving a head unit 101 in the secondary scanning direction (X direction), and an X-direction drive motor 103 for rotating the X-direction guide shaft 102. The device is also provided with a Y-direction guide shaft 105 for guiding a stage 104 in the primary scanning direction (Y direction) orthogonal to the secondary scanning direction, and a Y-direction drive motor 106 for engaging and rotating the Y-direction guide shaft 105. The device has a base 107 on which the X-direction guide shaft 102 and the Y-direction guide shaft 105 are arranged, and is provided with a controller 108 below the base 107.

There is also provided a cleaning mechanism 109 that moves along the Y-direction guide shaft 105 in order to clean (restoration treatment) the plurality of droplet discharge heads 20 of the head unit 101, and a heater 111 for heating the discharged fluid and vaporizing and drying the solvents. The cleaning mechanism 109 has a Y-direction drive motor 110 for engaging and rotating the Y-direction guide shaft 105.

A plurality of droplet discharge heads 20 (see FIG. 4) for coating a fluid onto a workpiece W is provided to the head unit 101. The plurality of droplet discharge heads 20 are capable of individually discharging the fluid in accordance with a discharge control signal supplied by the controller 108.

The X-direction drive motor 103 is not particularly limited and may be, e.g., a stepping motor or the like, and the motor rotates the X-direction guide shaft 102 when a drive pulse signal is supplied from the controller 108, and moves the head unit 101 engaged with the X-direction guide shaft 102 in the X direction.

Similarly, the Y-direction drive motors 106, 110 are not particularly limited and may be, e.g., a stepping motor or the like, and these motors engage and rotate the Y-direction guide shaft 105 when a drive pulse signal is supplied from the controller 108, and move the stage 104 and cleaning mechanism 109 provided with the Y-direction drive motors 106, 110 in the Y direction.

The cleaning mechanism 109 moves the droplet discharge heads 20 to a position that faces the head unit 101 during cleaning, and performs a routine for capping in which unnecessary fluid adhering to the nozzle surfaces of the droplet discharge heads 20 is suctioned, wiping in which the nozzle surface to which fluid or the like is deposited is wiped, performing preparatory discharge in which the fluid is discharged from all of the nozzles of the droplet discharge heads 20, and alternatively performing a routine for receiving and expelling unnecessary fluid. The details of the cleaning mechanism 109 are omitted.

The heater 111 is not particularly limited and is a means for heat-treating a workpiece W by lamp annealing, for example. The fluid discharged onto the workpiece W is heated and a heat treatment is carried out for vaporizing the solvent and converting the fluid to a film. The controller 108 also controls the power on and off of the heater 111.

The coating action of the droplet discharge device 100 is carried out by feeding a prescribed drive pulse signal from the controller 108 to the X-direction drive motor 103 and the Y-direction drive motor 106, and moving the head unit 101 in the secondary scanning direction (X direction) and the stage 104 in the primary scanning direction (Y direction) relative to each other. A discharge control signal is then supplied from the controller 108 during the relative movement, and the fluid is discharged from the droplet discharge heads 20 and coated as droplets onto a prescribed area of the workpiece W.

FIG. 4(a) is a schematic perspective view showing the structure of a droplet discharge head. FIG. 4(b) is schematic plan view showing the arrangement of a plurality of nozzles. The diagrams used in the description have been appropriately reduced or enlarged.

The droplet discharge head 20 is a so-called piezo-type inkjet head having a tri-layer structure composed of a nozzle plate 21 having a plurality of nozzles 22, a reservoir plate 23 in which fluid channels are formed including a partition portion 24 for partitioning the nozzle plate in correspondence with the nozzles 22, and a vibration plate 28 having a piezoelectric element (piezo) 29 as energy generation means, as shown in FIG. 4(a). A plurality of pressure generation chambers 25 are formed by the nozzle plate 21, the partition portion 24 of the reservoir plate 23, and the vibration plate 28. The nozzles 22 are in communication with the pressure generation chambers 25 in a respective manner. A plurality of piezoelectric elements 29 are disposed on the vibration plate 28 so as to correspond to the pressure generation chambers 25.

A shared flow channel 27 for temporarily storing fluid fed from a tank (not shown) through a supply hole 28a formed in the vibration plate 28 is disposed in the reservoir plate 23. The fluid filled in the shared flow channel 27 is fed to the pressure generation chambers 25 via a supply port 26.

The droplet discharge head 20 has two nozzle rows 22a, 22b, as shown in FIG. 4(b), each having a plurality (180) of nozzles 22 having a diameter of about 28 μm arrayed at a pitch $P_1$. The two nozzle rows 22a, 22b are arranged on the nozzle plate 21 in a mutually offset state of half a nozzle pitch $P_2$ with respect to the pitch $P_1$. In this case, the pitch $P_1$ is about 140 μm. Accordingly, 360 nozzles 22 are arrayed at a nozzle pitch $P_2$ of about 70 μm as viewed from the direction orthogonal to the nozzle rows 22a, 22b. Therefore, the effective entire length of the nozzles of the droplet discharge head 20 having two nozzle rows 22a, 22b is the nozzle pitch $P_2 \times 359$ (about 25 mm). Also, the space between the nozzle rows 22a, 22b is about 2.54 mm.

The droplet discharge head 20 is configured so that a drive waveform as an electric signal is applied to the piezoelectric element 29, whereupon the piezoelectric element 29 as such warps and causes the vibration plate 28 to deform. The volume of the pressure generation chamber 25 is thereby made to fluctuate, a fluid filled in the pressure generation chamber 25 is compressed by a pumping effect produced by the fluctuation, and the fluid can be discharged as a droplet D from the nozzle 22.

The droplet discharge head 20 of the present embodiment has so-called double nozzle rows 22a, 22b, but no limitation is imposed thereby, and a single row is also possible. Drive means for discharging fluid as a droplet D from the nozzle 22 is not limited to a piezoelectric element 29, and it is also possible to use a heater as an electrothermal converter, an electrostatic actuator as an electromechanical converter, or other means.

A droplet discharge device 100 provided with such a droplet discharge head 20 is configured so that discharge data for coating fluid in a desired area on a workpiece W is inputted from a host computer or another external information-processing device to the controller 108, and the fluid is discharged as a droplet D from the nozzle 22 on the basis of the discharged data. Discharge data includes positional data related to a desired area on the workpiece W, control data for setting discharge timing, selection (ON)/de-selection (OFF) data of the plurality of nozzles 22 in the primary scanning between the droplet discharge head 20 and the workpiece W, and nozzle data of the number of droplet D discharges, and the like.

Figure 6:
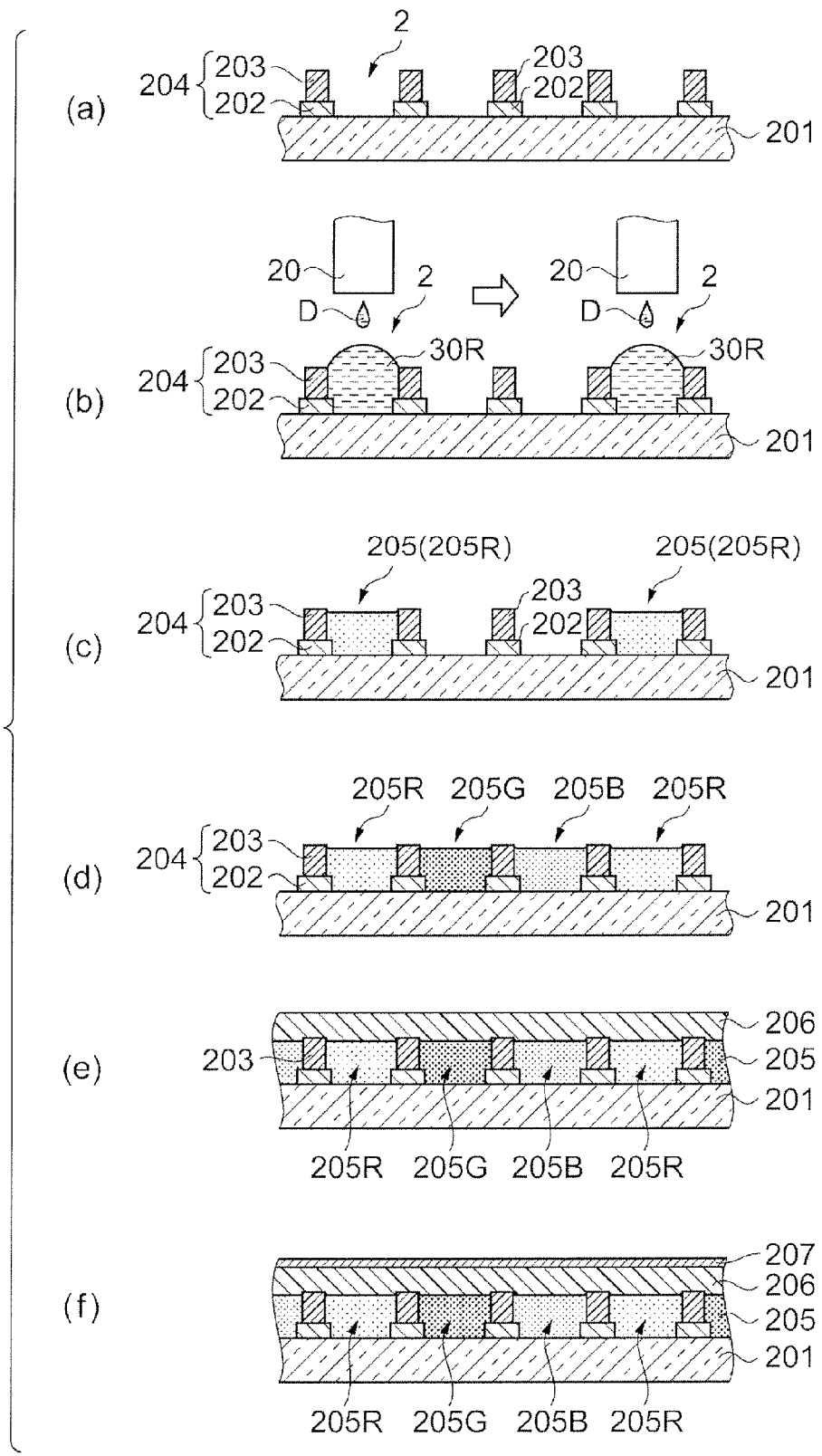
FIG. 6 includes a series of diagrams (a) to (f) showing schematic cross-sectional views for explaining a method for manufacturing a liquid crystal device.

The method for manufacturing a liquid crystal device 200 will be described in detail below. FIG. 5 is a schematic plan view showing a mother substrate; FIGS. 6(*a*) to 6(*f*) and FIGS. 7(*g*) to 7(*k*) are schematic cross-sectional views showing the method for manufacturing a liquid crystal device.

Manufacturing a liquid crystal device 200 in actuality involves the use of a mother substrate M1 provided with a plurality of counter substrates 201, and a mother substrate M2 provided with a plurality of element substrates 208 in the same manner, as shown in FIG. 5. The area for forming constituent elements that corresponds to the size of the liquid crystal panel 220 is set as designed on the mother substrates M1, M2. Film formation areas 3 shown by the shaded areas in FIG. 5 show the areas for forming the alignment film 214 (alignment film 215). In other words, the configuration is one in which counter substrates 201 that correspond to four liquid crystal panels 220 are obtained from a single mother substrate M1. Similarly, element substrates 208 that correspond to four liquid crystal panels 220 are obtained from a single mother substrate M2. The mother substrate M1 and mother substrate M2 on which the constituent elements of pixels are formed are joined and the assembly is severed to thereby remove the liquid crystal panels 220.

Step S1 of FIG. 2 is a partition wall formation step. In step S1, first, the lower layer bank 202 is formed on the surface of the counter substrate 201 so as to partition the film formation area 2, as shown in FIG. 6(*a*). A film composed of Cr, Al, or another metal film or metal compound is formed by vacuum deposition or sputtering as the formation method so as to impart light-blocking properties to the surface of the counter substrate 201. A photosensitive resin (photoresist) is applied by photolithography; and exposure, development, and etching are carried out so as to open a film formation area 2. A photosensitive partition wall formation material is subsequently applied in a thickness of about 2 μm by photolithography and then exposed and developed to form the upper layer bank 203 on the lower layer bank 202. The partition walls 204 have a so-called double-layered bank structure composed of the lower layer bank 202 and the upper layer bank 203. The partition walls 204 are not limited to this configuration, and a single layer structure may also be used, being composed of the upper layer bank 203 alone formed using a photosensitive partition wall formation material having light-blocking properties. The process then proceeds to step S2.

Step S2 of FIG. 2 is a CF formation step. In step S2, the mother substrate M1 (counter substrate 201) is disposed on the droplet discharge device 100, as shown in FIG. 6(*b*). Droplets D from the plurality of nozzles 22 of the droplet discharge head 20, which is filled with fluid 30R containing a coloring material, is discharged onto the film formation area 2 in synchronization with the relative movement in the primary scanning direction between the stage 104 provided with the mother substrate M1 (counter substrate 201) and the droplet discharge head 20. The total discharge amount of the fluid 30R discharged onto the film formation area 2 is controlled by sending a suitable control signal from the controller 108 to the droplet discharge head 20 on the basis of the discharge data in which the number of discharges and other data have been set so that a prescribed film thickness is obtained in a later drying step. The fluid 30R contains a red (R) coloring material and is discharged onto the prescribed film formation area 2. The mother substrate M1 (counter substrate 201) is heated by a heater 111 provided to the droplet discharge device 100, the solvent components are evaporated from the discharged fluid 30R to solidify the fluid, and a red-colored color filter 205R is formed, as shown in FIG. 6(*c*).

A fluid containing different coloring material is sequentially discharged in the order of green (G) and blue (B), and then dried to thereby form three color filters 205R, 205G, 205B in the manner shown in FIG. 6(*d*). No limitation is imposed by the above, and three fluid colors containing different coloring materials may be filled into respectively different droplet discharge heads 20, the droplet discharge heads 20 are mounted in the head unit 101, and the fluid is discharged from the droplet discharge heads 20 onto the desired film formation area 2. Also, a method may be used in which the mother substrate M1 (counter substrate 201) is set in a reduced-pressure drying apparatus that can keep the vapor pressure of the solvent constant, and the fluid is dried under reduced pressure.

The mother substrate M1 is preferably subjected to a surface treatment before the fluid is discharged so that the film formation area 2 is hydrophilic, and at least the upper layer bank 203 of the partition walls 204 is hydrophobic. In accordance with this configuration, the droplets D which have landed proceed to wet and spread uniformly inside the film formation area 2. The droplets D that have landed on the upper layer bank 203 can be readily accommodated in the film formation areas 2. The process then proceeds to step S3.

Step S3 of FIG. 2 is a smoothing layer formation step. In step S3, a smoothing layer 206 is formed so as to cover the color filter 205 and the upper layer bank 203, as shown in FIG. 6(*e*). Examples of the formation method include spin coating, roll coating, and other methods for coating and drying an acrylic-based resin. It is also possible to adopt a method in which a photosensitive acrylic resin is applied and thereafter cured by irradiating UV light. The thickness of the film is about 100 nm. The smoothing layer formation step may be omitted as long as the surface of the counter substrate 201 on which the color filter 205 is formed is relatively flat.

Step S4 of FIG. 2 is a transparent electroconductive film formation step. In step S4, a counter electrode 207 composed of ITO (Indium Tin Oxide) or another electroconductive material is formed on the smoothing layer 206, as shown in FIG. 6(*f*). Examples of the film formation method include sputtering and vapor deposition in a vacuum using ITO or another electroconductive material as a target. The thickness of the film is about 10 nm. The counter electrode 207 thus formed may be appropriately shaped (patterned) as required. The process then proceeds to step S5.

Figure 7:
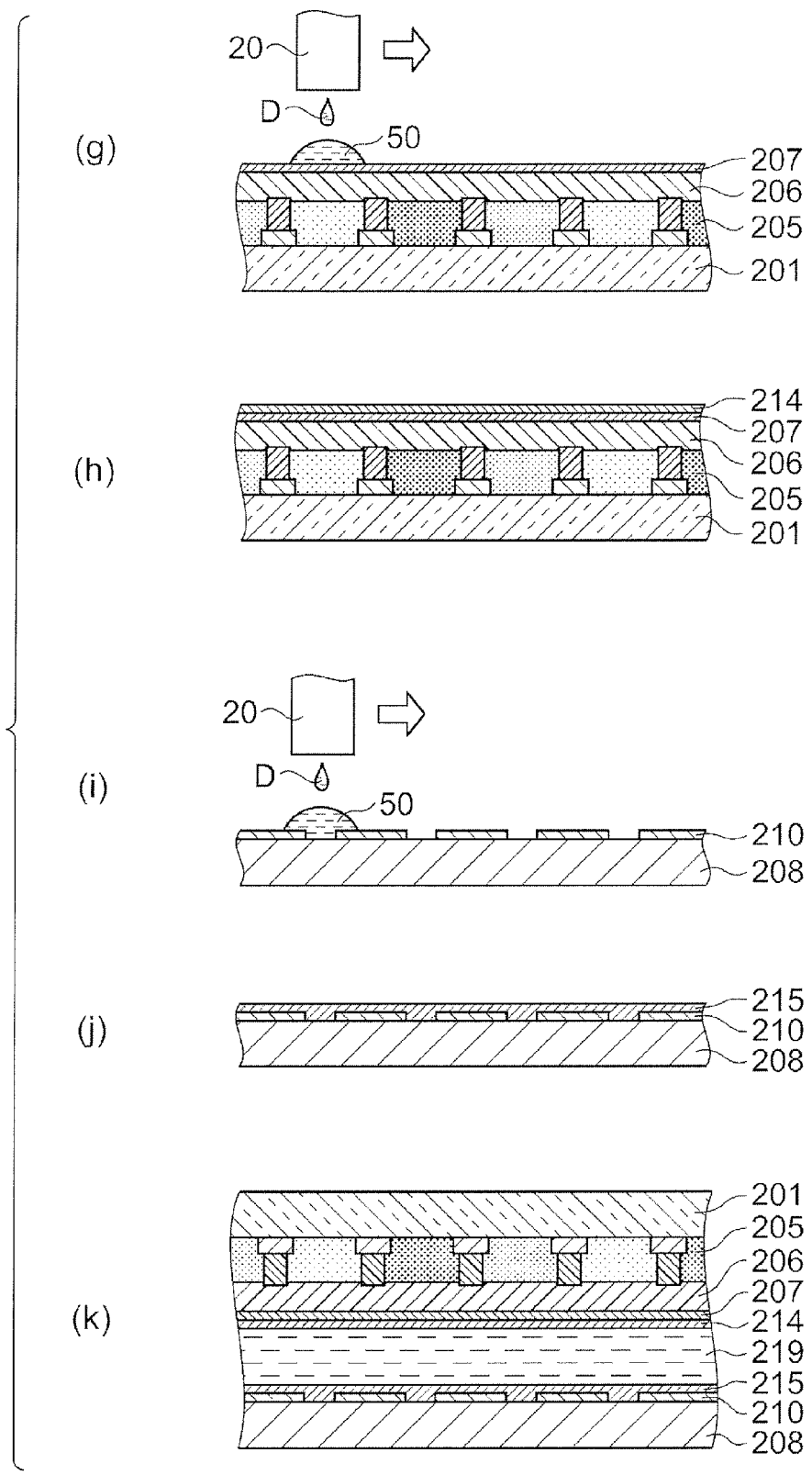
FIG. 7 includes a series of diagrams (g) to (k) showing schematic cross-sectional views for explaining the method for manufacturing the liquid crystal device.

Step S5 of FIG. 2 is a CF-side alignment film formation step. In step S5, the composition for forming an alignment film (fluid 50) described above is applied so as to cover the counter electrode 207, as shown in FIG. 7(*g*). The coating method may be one in which the fluid 50 is filled into the droplet discharge head 20 and discharged as droplets D using the droplet discharge device 100 onto the film formation area 3 shown in FIG. 5. In this case as well, the mother substrate M1 (counter substrate 201) is preferably subjected to a surface treatment in advance so that the discharged droplets D uniformly wet and spread on the surface of the counter electrode 207. An example of the surface treatment is a plasma treatment in which $O_2$ is used as the treatment gas.

The wetting and spreading of the droplets D after landing depends on the following characteristics a) to c): a) The surface tension and viscosity of the composition for forming an alignment film (fluid 50); b) The surface treatment state (interfacial tension) of the mother substrate M1 (counter substrate 201); and c) The amount of droplets D discharged. The characteristics a) and b) can be adjusted in the manner described above. Here, the method of discharging the fluid 50 will be described with focus on characteristic c).

Figure 8:
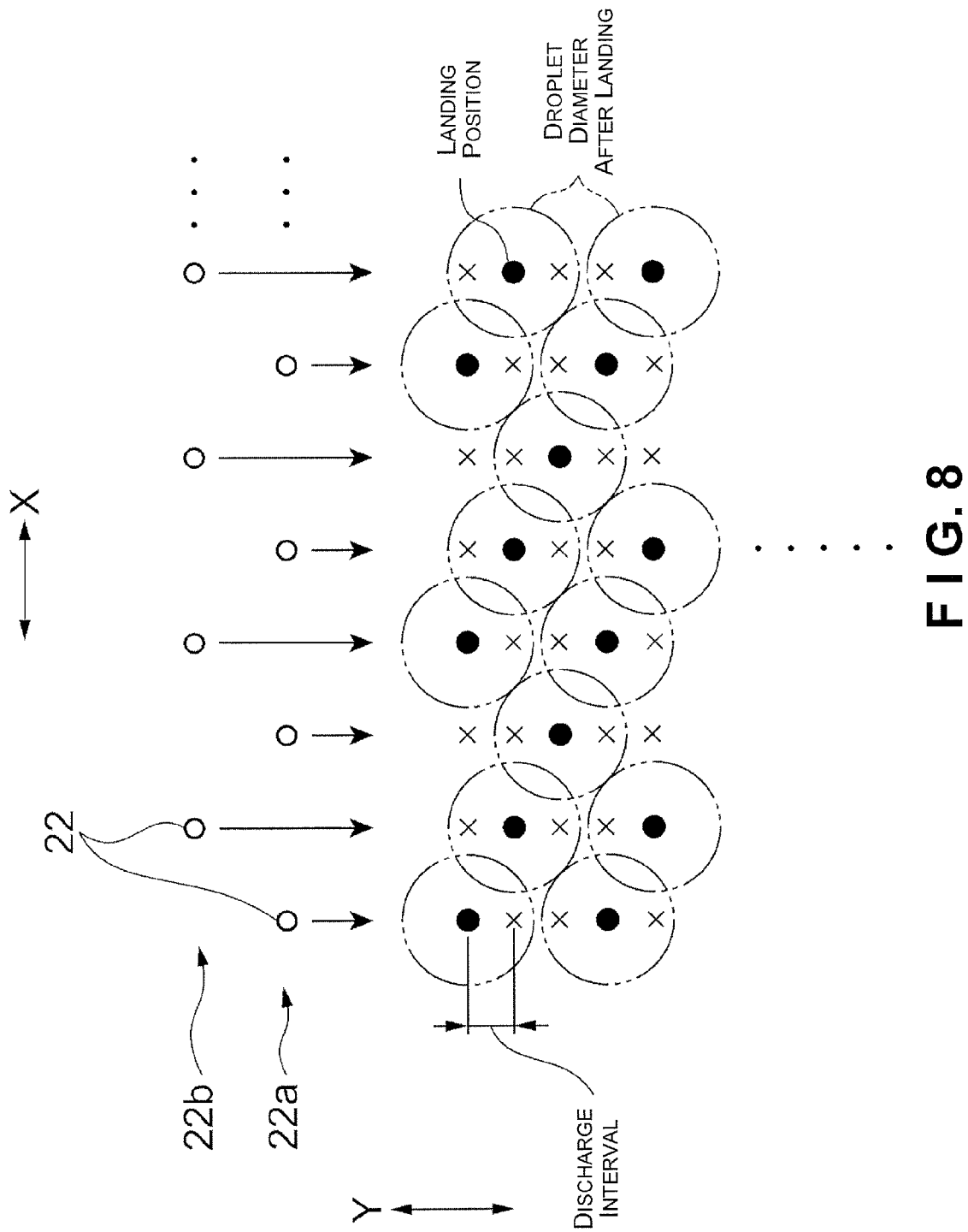
FIG. 8 is a schematic plan view showing a method of discharging a fluid.

FIG. 8 is a schematic plan view showing a method of discharging a fluid. The droplet discharge head 20 has two nozzle rows 22a, 22b as described above. The nozzle rows 22a, 22b are each composed of 180 nozzles 22 (see FIG. 4). The amount of droplets D discharged from each of the 180 nozzles 22 is not necessarily constant. For example, when the droplets D are simultaneously discharged from adjacent nozzles 22, the drive voltage pulses applied to the piezoelectric element 29 are distorted and so-called electrical crosstalk occurs. Also, so-called mechanical crosstalk is caused by structural differences in the fluid channel and the like that reach the adjacent nozzles 22. The amount of droplets D discharged varies due to the electrical and mechanical crosstalk.

In view of the above, in the present embodiment, discharge data is generated so that droplets D are not simultaneously discharged from adjacent nozzles 22 of the nozzle rows 22a, 22b, as shown in FIG. 8. Variability of the amount of discharged droplets D caused by electrical or mechanical crosstalk is thereby reduced. Droplets D are discharged from the other nozzle row 22b so as to supplement the landing state of the droplets D discharged from the first nozzle row 22a. The droplet diameter after landing depends on the state of wetting and spreading on the landing surface as described above. When the amount of droplets D is stable, the droplet diameter is also stable. The discharge interval between the nozzle rows 22a and 22b is adjusted so that the droplets D after landing wet, spread, and uniformly mix with each other. The discharge interval can be adjusted by setting the discharge timing that corresponds to the relative movement speed between the droplet discharge head 20 and the mother substrate M1 as the workpiece W. In accordance with this configuration, the fluid 50 can be uniformly coated on the surface of the mother substrate M1 in primary scanning. In the present embodiment, the fluid 50 is applied onto the film formation areas 3 by combining the primary scan for discharging droplets D in the Y direction and the secondary scan for moving the droplet discharge head 20 in the X direction, and performing the scans for a plurality of cycles in accordance with the size and arrangement of the film formation area 3 on the mother substrate M1. In this case, the amount of droplets D to be discharged is set to about 10 ng so that the thickness of the film after drying is about 100 nm.

Next, the fluid 50 thus coated is dried and formed into a film (prebake). In the present embodiment, a gap is provided on a heated hot plate (HP), and the mother substrate M1 is mounted and dried so that the drying proceeds in a uniform fashion on the coated surface. The drying conditions are set to, e.g., an HP heating temperature of 70 to 100° C., preferably 80° C., and a gap of about 5 mm. A majority of the solvent component can uniformly evaporate with a drying time of several minutes to about 5 minutes. In the fluid 50, i.e., the composition for forming an alignment film, a solvent having the highest possible boiling point is included in the first organic solvent. Therefore, leveling proceeds during drying, and coating non-uniformities are not likely to be apparent. In other words, an alignment film 214 in which the thickness of the film is substantially uniform can be obtained.

The solvent components in the alignment film 214 are furthermore removed and post-baking is carried out in order to solidify the film. The post-baking conditions are preferably 10 minutes to 1 hour at 180 to 250° C. for heating and drying. The formation of the alignment film 214 is thereby completed, as shown in FIG. 7(h). The process then proceeds to step S6.

Step S6 of FIG. 2 is an element-side alignment film formation step. In step S6, the fluid 50 is applied so as to cover the pixel electrodes 210 and the like of the mother substrate M2 (element substrate 208), as shown in FIG. 7(i). The coating method and the prebake and post-bake methods are the same as in step S5. An alignment film 215 is thereby layered and formed on the element substrate 208, as shown in FIG. 7(j). The step for forming the pixel electrode 210, the TFT element 211, the scan line 212, and the data line 213 on the mother substrate M2 may be any known method, and a description is omitted here. The process then proceeds to step S7.

Step S7 of FIG. 2 is a liquid crystal filling and assembly step. In step S7, the counter substrate 201 on which the alignment film 214 is formed and the element substrate 208 on which the alignment film 215 is formed are set facing each other in prescribed positions and joined via a seal material, as shown in FIG. 7(k). A liquid crystal is filled into the gaps between the counter substrate 201 and the element substrate 208 to form a liquid crystal layer 219. An example of the method for filling the liquid crystal entails forming a seam material in the form of a frame using a printing method or a discharge method on one of the pair of substrates; this structure is viewed as a receptacle into which a required amount of the liquid crystal is dropped in a vacuum, and the other substrate is joined to the first substrate. A thermosetting epoxy adhesive, for example, is advantageously used as the seal material. The seal material includes a gap material so that the space (gap) between the counter substrate 201 and the element substrate 208, i.e., the thickness of the liquid crystal layer 219, is constant. Examples of the gap material include hard resin particles and glass fibers having a prescribed diameter.

The liquid crystal device 200 is completed by laminating the upper and lower polarizing plates 216, 217 on the front and rear surfaces of the cells formed in this manner. The liquid crystal device 200 is used by providing an illumination device 218 for illuminating the liquid crystal device on the rear surface side of the element substrate 208 (see FIG. 1).

EXAMPLES AND COMPARATIVE EXAMPLES

FIG. 9 is a pair of tables (a) and (b) showing the examples, comparative examples, and corresponding evaluation results of a composition for forming an alignment film applied to the manufacture of a liquid crystal device with FIG. 9(a) being a table showing the examples, and FIG. 9(b) being a table showing the comparative examples.

Examples 1 to 3

In examples 1 to 3, γ-butyrolactone was selected as the principal good solvent from the group composed of γ-butyrolactone, N-methyl-2-pyrrolidone, N,N'-dimethyl-2-imidazolidinone, and propylene carbonate as the first organic solvent; and the concentration was set to 40 wt %, as shown in FIG. 9(a). N-methyl-2-pyrrolidone was selected as a secondary good solvent, and the concentration was set to 30 wt %. A solvent was selected as the second organic solvent from the group composed of diethylene glycol dimethyl ether, diethylene glycol ethyl methyl ether, and ethylene glycol monobutyl ether.

Examples 4 to 6

In examples 4 to 6, propylene carbonate was selected as the principal good solvent from the group composed of γ-butyrolactone, N-methyl-2-pyrrolidone, N,N'-dimethyl-2-imidazolidinone, and propylene carbonate as the first organic solvent; and the concentration was set to 40 wt %, as shown in FIG. 9(a). N,N'-dimethyl-2-imidazolidinone was selected as a secondary good solvent, and the concentration was set to 30 wt %. A solvent was selected as the second organic solvent from the group composed of ethylene glycol monobutyl ether, diethylene glycol monoethyl ether, and diethylene glycol butyl methyl ether.

In the selection of the second organic solvent in examples 1 to 6, the second organic solvent was selected so that a solvent having the lowest possible vapor pressure was contained in the first organic solvent. In other words, the solvents were combined so as to obtain a positive value by subtracting the lowest vapor pressure $P_{min}$ (A) of the selected first organic solvent from the vapor pressure $P_{min}$ (B) of the selected second organic solvent.

In examples 1 to 6, the alignment film material, which is a solute, that was used in examples 1 to 6 was AL-60601 (vertical alignment agent) manufactured by JSR Corporation, and the solids concentration was set to 4 wt %. The ratio of the first organic solvent and the second organic solvent in the solvent component was 70 wt %/30 wt %.

Comparative Examples 1 and 2

In comparative examples 1 and 2, γ-butyrolactone was selected as the principal good solvent from among γ-butyrolactone, N-methyl-2-pyrrolidone, N,N'-dimethyl-2-imidazolidinone, and propylene carbonate as the first organic solvent; and the concentration was set to 40 wt % in the same manner as examples 1 to 3, as shown in FIG. 9(b). N-methyl-2-pyrrolidone was selected as a secondary good solvent, and the concentration was set to 30 wt %. A solvent was selected as the second organic solvent from the group composed of diethylene glycol monoethyl ether and diethylene glycol dibutyl ether.

Comparative Example 3

In comparative example 3, propylene carbonate was selected as the principal good solvent from among γ-butyrolactone, N-methyl-2-pyrrolidone, N,N'-dimethyl-2-imidazolidinone, and propylene carbonate as the first organic solvent; and the concentration was set to 40 wt % in the same manner as in examples 4 to 6, as shown in FIG. 9(b). N,N'-dimethyl-2-imidazolidinone was selected as a secondary good solvent, and the concentration was set to 30 wt %. Diethylene glycol dibutyl ether was selected as the second organic solvent.

In the selection of the second organic solvent in comparative examples 1 to 3, the second organic solvent was selected so that a solvent having the lowest possible vapor pressure was contained in the second organic solvent. In other words, the solvents were combined so as to obtain a negative value by subtracting the lowest vapor pressure $P_{min}$ (A) of the selected first organic solvent from the vapor pressure $P_{min}$ (B) of the selected second organic solvent. Also, the ratio of the first organic solvent and the second organic solvent in the solute, the solids concentration thereof, and the solvent components was the same as in examples 1 to 6.

The resulting composition for forming an alignment film was coated in a post-drying thickness of 100 nm on an ITO substrate using the droplet discharge device 100 to form an alignment film.

Non-uniformities (streaks and bumps in the edge portion) in the resulting alignment film were visually inspected and evaluated as ◯ when the formed film was good, and as × when a film was not formed. The results are summarized in the table. Any of the discharge conditions set in step S5 described above are suitable as the discharge conditions (nozzle selection and setting of the discharge interval for each nozzle row 22a, 22b) of the composition for forming an alignment film.

In the method for forming a film in which the compositions for forming an alignment film according to examples 1 to 6 are used, streaks caused by leveling characteristics did not occur and a good alignment film was formed in a uniform manner.

In the method for forming a film in which the compositions for forming an alignment film of comparative examples 1 to 3 are used, streaks occurred and a good alignment film could not be formed.

It is apparent from the makeup and the physical properties of the composition for forming an alignment film according to examples 1 to 6 and comparative examples 1 to 3 that a film with good leveling characteristics and reduced coating non-uniformities (streaks) could be formed when the mixed solvent had a composition in which the first organic solvent contained a solvent having the lowest possible vapor pressure. Organic solvents having a higher boiling point generally tend to have a lower vapor pressure, but this is not always the case in actuality. For example, γ-butyrolactone and N-methyl-2-pyrrolidone, which are first solvents, both have a boiling point of 204° C., but exhibit a high vapor pressure in comparison with diethylene glycol monoethyl ether, which is a second organic solvent having a lower boiling point, as shown in FIG. 9(a). Consequently, it is effective for the first organic solvent to contain a solvent having a lowest possible vapor pressure in order to improve the leveling characteristics after coating.

The following effects are obtained in accordance with the method described above.

(1) In accordance with the method for manufacturing a liquid crystal device 200 described above, the composition for forming an alignment film described above is applied onto the substrate surface using the inkjet method in the step for forming the alignment films 214, 215. Accordingly, the leveling characteristics in the coating film are improved and coating non-uniformities can be reduced. Therefore, alignment films 214, 215 having a substantially uniform thickness can be formed after prebaking. Consequently, orientation non-uniformities caused by coating non-uniformities are reduced, and a liquid crystal device 200 having high display quality can be manufactured.

(2) In the method for manufacturing a liquid crystal device 200 described above, nozzles are selected in the alignment film formation step (step S5 and step S6) so that the fluid 50 (composition for forming an alignment film described above) is not simultaneously discharged from adjacent nozzles 22 when the fluid is discharged as droplets D from the plurality of nozzles 22. The discharge intervals of the nozzle rows 22a, 22b are set so that the droplets D that have landed on the substrate surface wet, spread, and mix with each other without non-uniformities. Therefore, the fluid 50 can be coated onto the substrate surface without non-uniformities.

Various modified examples are possible apart from the embodiments described above. The modified examples will be described below.

Modified Example 1

The composition for forming an alignment film according to the embodiment described above is not limited to the composition of examples 1 to 6 illustrated above. For example, the first organic solvent may be composed using a single good solvent.

Modified Example 2

In the method for manufacturing a liquid crystal device 200 described above, the step for using the composition for forming an alignment film according to the embodiment is not limited to being a step for forming the alignment films 214, 215. For example, the liquid crystal device 200 is sometimes structured having a phase difference layer on the surface of the inside or the outside of the cells of the liquid crystal panel 220 and having the phase difference layer formed using a liquid crystal polymer. In such a case, an alignment film is formed in advance on the formation surface of the phase difference layer. The composition for forming an alignment film described above is subjected to an orientation treatment in a prescribed direction in order to set the slow axis of the phase difference layer.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A composition for forming an alignment film used during formation of an alignment film with a droplet discharge method, the composition comprising:
   a solute including an alignment film formation material;
   a first organic solvent that dissolves the solute; and
   a second organic solvent for controlling surface tension,
   the first organic solvent including a solvent having a lowest vapor pressure among all of solvent components in the composition,
   the first organic solvent including N-methyl-2-pyrrolidone and γ-butyrolactone, and
   the second organic solvent including diethylene glycol ethyl methyl ether.

2. The composition according to claim 1, wherein
   the first organic solvent is from 50 to 95 wt % of all of the solvent components with the solvent having the lowest vapor pressure being 25 to 95 wt % of all of the solvent components.

3. A composition for forming an alignment film used during formation of an alignment film with a droplet discharge method, the composition comprising:
   a solute including an alignment film formation material;
   a first organic solvent that dissolves the solute; and
   a second organic solvent for controlling surface tension,
   the first organic solvent including a solvent having a lowest vapor pressure among all of solvent components in the composition,
   the first organic solvent including N,N'-dimethyl-2-imidazolidinone and propylene carbonate, and
   the second organic solvent including diethylene glycol butyl methyl ether.

4. The composition according to claim 1, wherein
   the solute has a solid concentration of 1 wt % or more and 10 wt % or less, a viscosity of 3 mPa·s or more and 20 mPa·s or less, and a surface tension of 30 mN/m or more and 45 mN/m or less.

5. A method for manufacturing a liquid crystal device comprising:
   coating a surface of a substrate of the liquid crystal device by discharging droplets of the composition according claim 1; and
   forming an alignment film on the substrate by processing the composition discharged onto the substrate.

6. The composition according to claim 3, wherein
   the first organic solvent is from 50 to 95 wt % of all of the solvent components with the solvent having the lowest vapor pressure being 25 to 95 wt % of all of the solvent components.

7. The composition according to claim 3, wherein
   the solute has a solid concentration of 1 wt % or more and 10 wt % or less, a viscosity of 3 mPa·s or more and 20 mPa·s or less, and a surface tension of 30 mN/m or more and 45 mN/m or less.

* * * * *